Aug. 30, 1966  G. K. MULHOLLAND ETAL  3,269,745
NORMALLY APPLIED DRAWBAR RELEASED VEHICLE BRAKING SYSTEM
Filed Aug. 21, 1963  3 Sheets-Sheet 1

INVENTOR.
GEORGE KEITH MULHOLLAND
EDWIN O. KLEMM
BY
*Learman, Learman, & McCulloch*
ATTORNEYS Aug. 30, 1966   G. K. MULHOLLAND ETAL   3,269,745
NORMALLY APPLIED DRAWBAR RELEASED VEHICLE BRAKING SYSTEM
Filed Aug. 21, 1963   3 Sheets-Sheet 2

INVENTOR.
GEORGE KEITH MULHOLLAND
EDWIN O. KLEMM
BY
ATTORNEYS

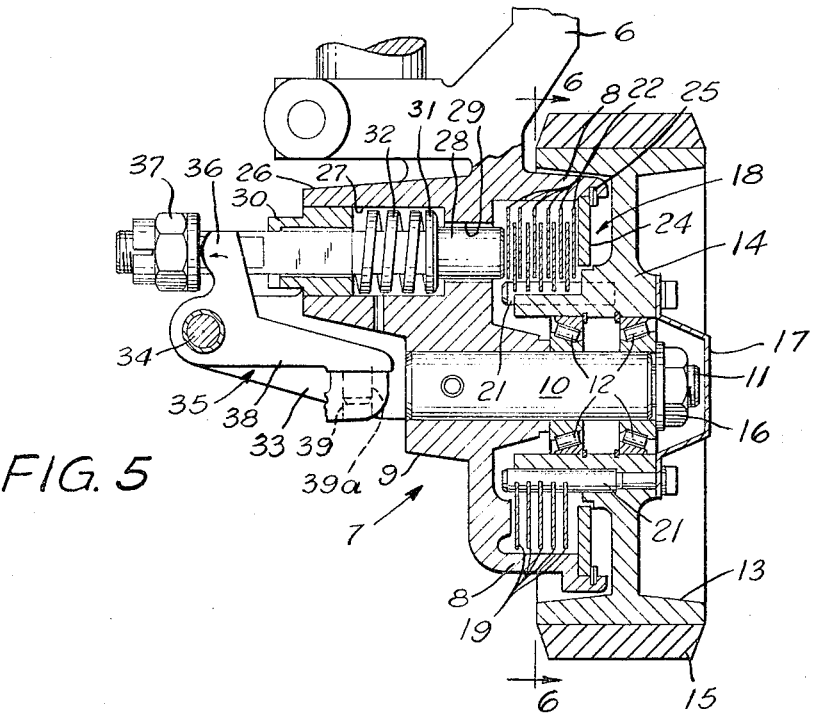
FIG. 5
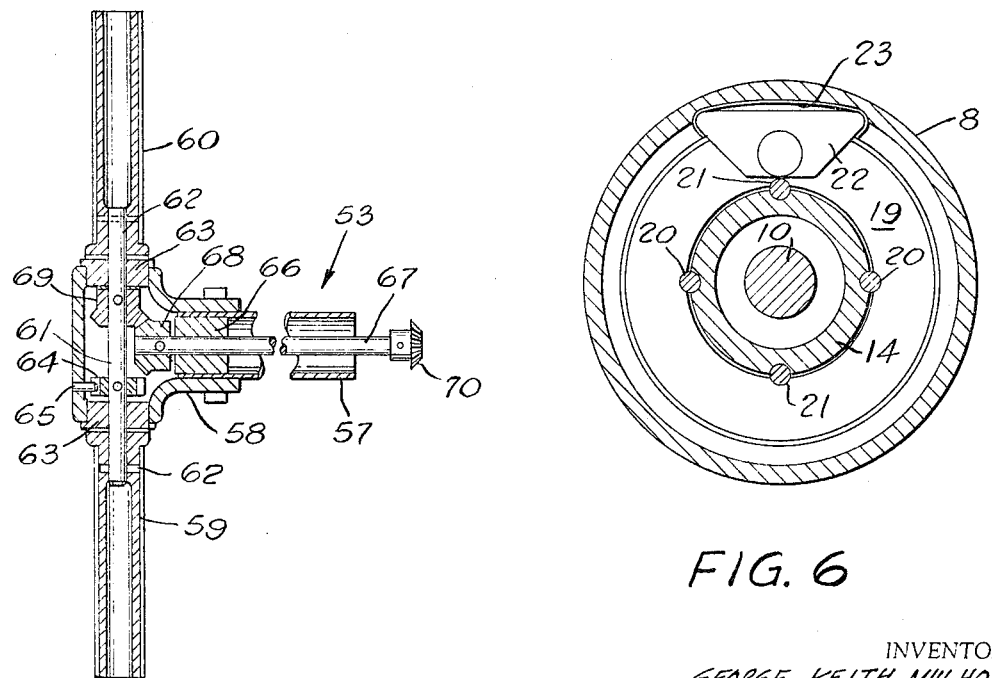
FIG. 7
FIG. 6
INVENTOR.
GEORGE KEITH MULHOLLAND
EDWIN O. KLEMM
BY
*Larson, Larson, & McCulloch*
ATTORNEYS United States Patent Office 3,269,745
Patented August 30, 1966

3,269,745
NORMALLY APPLIED DRAWBAR RELEASED
VEHICLE BRAKING SYSTEM
George Keith Mulholland and Edwin O. Klemm, Saginaw, Mich., assignors to Saginaw Products Corporation, Saginaw, Mich., a corporation of Michigan
Filed Aug. 21, 1963, Ser. No. 303,534
19 Claims. (Cl. 280—47.11)

This invention relates to vehicles and more particularly to truck and trailer constructions having a swingable drawbar and provided with wheel brakes that normally are urged toward wheel braking engagement and which selectively may be released and engaged regardless of the angular position of the drawbar.

It is fairly common practice to equip hand trucks and like vehicles with wheel brakes and to provide for automatic engagement or disengagement of the brakes depending on the position of a swingable drawbar. There are many instances, however, when it is desirable to effect setting or releasing of the brakes in areas where it is inconvenient or impossible to manipulate the drawbar in the manner required.

An object of this invention is to provide manually operable braking means for a wheeled vehicle having a swingable drawbar and wherein the brakes may be engaged or released independently of the position of the drawbar.

Another object of the invention is to provide a braking mechanism for a wheeled vehicle of the character referred to and wherein means is provided for constantly urging the brakes toward their engaged positions so as to assure the application of the brakes at all times when the vehicle is unattended.

A further object of the invention is to provide a wheeled vehicle as aforesaid and wherein the wheels are mounted for swiveling movements to facilitate movements of the vehicle and the loads supported thereby.

Another object of the invention is to provide improved braking mechanism for a swivelable wheeled vehicle and wherein means for manipulating the brake operating mechanism is controllable through a drawbar without regard to the position to which the wheels have been swiveled.

A further object of the invention is to provide a vehicle of the kind described and wherein swiveling movements of the wheels may be imparted by swiveling movements of the drawbar, and in which a mechanical advantage is provided to effect magnification of the swiveling movements imparted by the drawbar to the wheels.

Other objects and adavntages of the invention will be pointed out specifically or will become apparent from the following description when it is considered in conjunction with the appended claims and the accompanying drawings, in which:

FIGURE 5 is a sectional view taken on the line 5—5 of FIGURE 1;

FIGURE 6 is a sectional view taken on the line 6—6 of FIGURE 5; and

FIGURE 7 is a sectional, fragmentary view of the drawbar.

Figure 1:
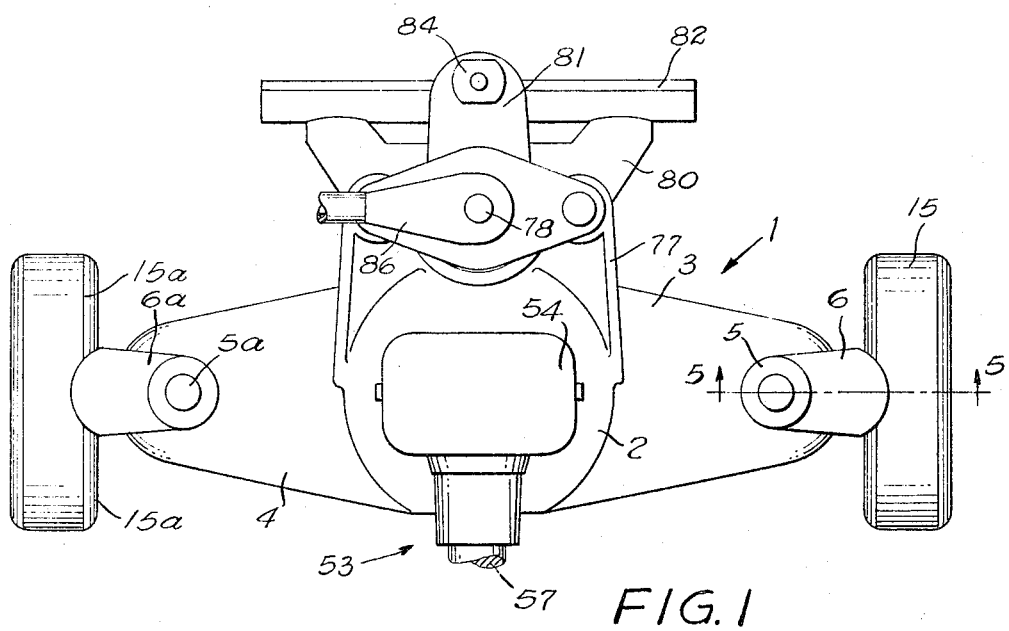
FIGURE 1 is a fragmentary, top plan view of a vehicle constructed in accordance with the invention.

A vehicle constructed in accordance with the invention comprises a support or frame 1 including a central block or housing 2 to which is bolted or otherwise suitably secured a pair of laterally extending frame housing members 3 and 4. At the outer end of the frame member 3 is rotatably journaled a kingpin 5, the upper and lower ends of which are mounted in a clevis-like bracket 6 forming an integral part of a wheel journaling frame 7. Parts similar to those just described and to be described hereinafter are also provided at the outer end of the frame member 4 and are identified by similar reference characters, followed by the suffix a.

As is best illustrated in FIGURE 5, the frame 7 comprises an annular flange 8 that is open at its outer end. The frame 7 also includes a centrally bored member 9 that supports the flange 8 and in which is fixed an axle 10 having a reduced, threaded outer end 11. Rotatably journaled on the axle 10 by means of bearings 12 is a wheel 13 having a hub 14 that surrounds the axle 10 and having a rubber or other tire 15 at its outer periphery. A nut 16 is threaded on the end 11 of the axle and maintains the wheel assembled with the latter. Preferably, a hub cap 17 overlies the nut 16 and is secured by screws or the like to the hub 14.

Brake means designated generally by the reference character 18 are provided for both wheels 13, 13a and preferably comprise brakes of the so-called disk type. As is best illustrated in FIGURES 5 and 6, the brake mechanism comprises a plurality of annular rings or disks 19 that surround the wheel hub 14 and are provided with a plurality of semicircular notches or recesses 20 for the accommodation of pins 21 that are supported in and rotate with the wheel hub 14. The notches 20 and the pins 21 mount the rings 19 on the wheel 13 for rotation with the latter, but the rings 19 are movable longitudinally of the pins 21.

The brake mechanism 18 also comprises a plurality of segment-shaped plates 22 that are supported in a retaining member 23 that is carried at the upper part of the flange 8 so as to be nonrotatable with the wheel 13. The members 22 are interleaved with the rings 19 and are movable toward and away from one another in a manner and for a purpose presently to be described. The plates 22 are prevented from and restrained against excessive outward movement by a retaining ring 24 carried by the flange 8 and secured to the latter by snap rings.

Carried by the member 9 of the frame 7 is a tubular extension 26 having a bore 27 therein and in which is slidably mounted a brake operating rod or member 28. Communicating with the bore 27 is an opening 29 through which one end of the member 28 extends for engagement with the inner most brake member 22. The opposite end of the bore 27 receives a nipple 30 through which the brake operating member 28 also projects. Fixed on the operating member 28 in such position as to be located within the bore 27 is a flange 31 against which one end of a powerful force applying spring 32 seats. The opposite end of the spring 32 seats against the inner end of the nipple 30. The arrangement is such that the spring 32 constantly exerts a force on the operating member 28 tending to urge it towards its brake applying position so as to effect frictional engagement between the brake parts 19 and 22.

Figure 3:
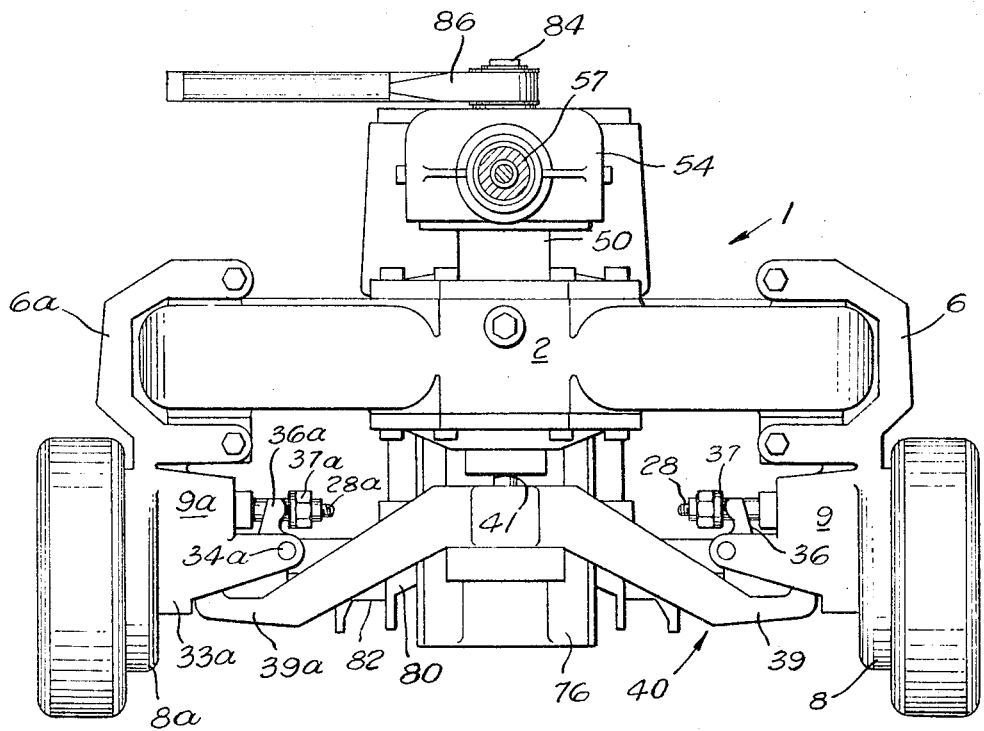
FIGURE 3 is a view partly in front elevation and partly in section of the vehicle.

Fixed on the frame 7 is a pair of parallel bracket arms 33 to and between which is pivoted as at 34 a bell crank lever generally designated 35 that is operable to disable the force applying spring 32. The lever 35 includes a bifurcated arm 36 which straddles the operating member 28 and is adapted to bear against the flat face of a nut 37 that is threaded on the member 28. The nut may be adjusted longitudinally of the member 28 to permit adjustment of the point of reaction between the lever 35 and the member 28. The bell crank 35 also includes a second arm 38 that is pivoted by a vertical pin 39a to one arm 39 (FIGURE 3) of a vertically reciprocable and swivelable yoke 40 which substantially spans the distance between the two wheels 13 and 13a.

Figure 4:
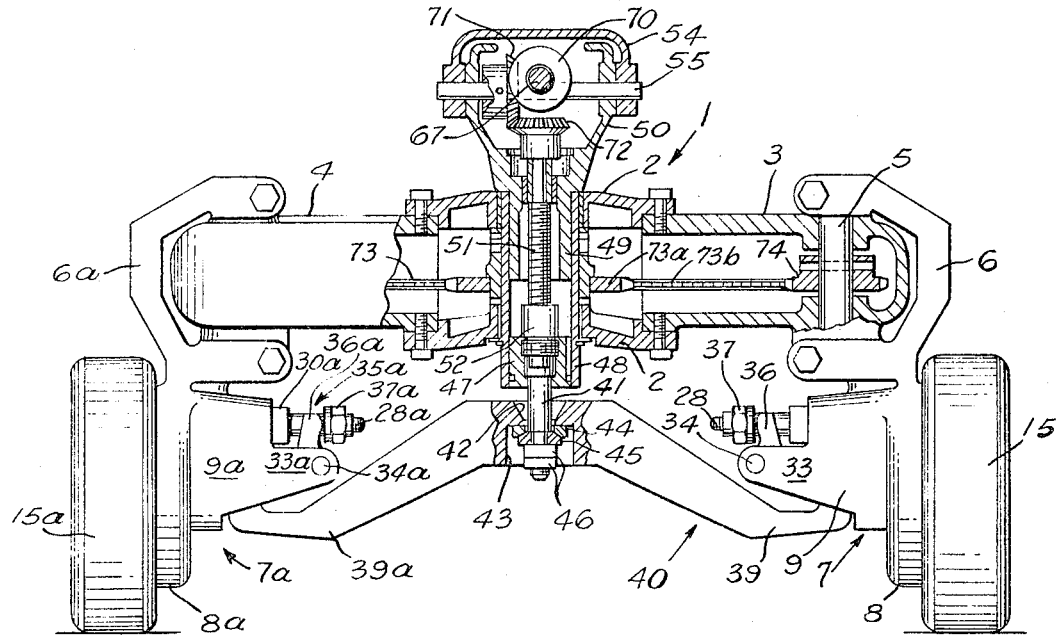
FIGURE 4 is a view similar to FIGURE 3, but with certain additional parts of the apparatus being shown in section.

The yoke 40 is suspended from a vertically extending shaft 41 (see FIGURE 4) that extends through openings 42 and 43 formed in the yoke 40. At the base of the opening 43 is an annular bearing 44 against which seats a complementary bearing 45 that is fixed on the shaft 41 by lock nuts 46. The arrangement is such that the yoke 40 is swivelable about the substantially vertical axis defined by the shaft 41.

The upper end of the shaft 41 is fixed to a vertically reciprocable plug 47 that is slideably mounted within a vertical sleeve 48 which is rotatably mounted in the frame 2 for rotation about a substantially vertical axis. Fixed within the sleeve 48 is a tubular extension 49 that projects downwardly from a hollow gear housing 50 which extends above the frame member 2. Rotatably mounted within the extension 49 is a threaded shaft 51, the lower end of which extends through a ball nut 52 that is fixed to the plug 47. The shaft 51 is so mounted as to be free to rotate, but it is not movable axially. As a result, rotation of the shaft 51 in one direction or the other effects axial movement of the nut 52 on the shaft and causes the yoke 40 to be raised or lowered. Raising of the yoke 40 causes counterclockwise rocking of the bell crank 35 and simultaneous clockwise rocking of the bell crank 35a, thereby effecting movement of the respective brake operating members 28, 28a toward one another so as to disengage the brake parts of the respective brake mechanisms and permit rotation of the wheels 13, 13a.

Apparatus constructed in accordance with the invention includes a drawbar member 53 comprising a housing 54 that partially overlies the housing 50 and is pivoted to the latter by means of a substantially horizontal spindle 55. Projecting from the housing 54 is a tubular extension 56 in which is fixed one end of a sleeve 57, the opposite end of the latter being fixed in a T fitting 58. Rotatably journaled in the fitting 58 is a pair of aligned handles 59, 60, each of which is pinned to a shaft 61 by means of a pin 62. The shaft 61 is rotatably journaled in bearings 63 supported at the outer ends of the member 58. Fixed on the shaft 61 is a stop member 64 that is adapted to engage a stop pin 65 supported in the member 58. The arrangement is such that rotation of either handle 59 or 60 causes rotation of the shaft 61 within the limits defined by the stop members 64 and 65.

Rotatably journaled in bearings 66 supported in the sleeve 57 is a shaft 67. The outer end of the shaft 67 has fixed thereto a bevel gear 68 that meshes with a similar gear 69 which is fixed to the shaft 61. At the opposite end of the shaft 67 is fixed a bevel gear 70 that meshes with a similar gear 71 fixed on the spindle 55. The gear 71 also meshes with a bevel gear 72 that is fixed to the threaded shaft 51. The construction and arrangement of these parts are such that rotation of either shaft 59 or 60 causes rotation of the gear 69 so as to impart rotation to the shaft 67. Rotation of the shaft 67 is imparted to the screw shaft 51 via the gears 70, 71 and 72 so as to effect selective raising and lowering of the yoke 40, thereby effecting disengagement and engagement, respectively, of the parts of the brake mechanism.

The screw 51 and the ball nut 52 are highly efficient motion transmission devices and require the application of little effort to effect relative movement thereof. In the disclosed embodiment of the invention, the brake operating members 28, 28a are constantly urged by their associated springs toward their brake applying positions, and those same springs constantly act on the levers 35, 35a tending to effect downward movement of the yoke 40 and of the ball nut 52. The force of the springs is more than enough to effect downward movement of the nut upon the release of the handles 59 and 60.

The drawbar assembly 53 is swingable between raised and lowered positions about the substantially horizontal axis of the spindle 55. Regardless of the position to which the drawbar assembly has been swung, the brake actuating mechanism may be manipulated by rotation of the handles to release the wheel brakes. The drawbar assembly also is swivelable about the substantially vertical axis of the extension 49 on the housing 50 without having any effect on the brake manipulating mechanism.

Means is provided for effecting turning or swiveling of the wheels 13, 13a in response to swiveling movements of the drawbar assembly. The wheel swiveling means comprises a collar 73 (see FIGURE 4) which is keyed or otherwise suitably fixed to the sleeve 48. Fixed to the collar 73 is a sprocket wheel 73a having teeth engaging a sprocket chain 73b. The chain 73b is trained around a sprocket wheel 74 that is fixed on the kingpin 5, and the chain also is trianed around a similar sprocket wheel that is fixed on the kingpin 5a. The sprocket wheel 73a has a diameter that is twice the diameter of the sprockets 74. In the operation of the wheel swiveling means, rotation of the housing 50 and the sleeve 48 causes corresponding rotation of the sprocket wheel 73a, and the rotation of the latter is transmitted to the sprockets 74 via the chain 73b. Rotation of the sprockets 74 effects swiveling movements of the wheels through an arc twice as large as the arc through which the drawbar assembly is swiveled. The connection of the arms 39, 39a to the respective bell crank 35, 35a is on the axis of the corresponding kingpin 5, 5a, thereby permitting swiveling of the wheels and the wheel journaling frames 7 and 7a without interfering with the brake actuating movements of the yoke 40.

Figure 2:
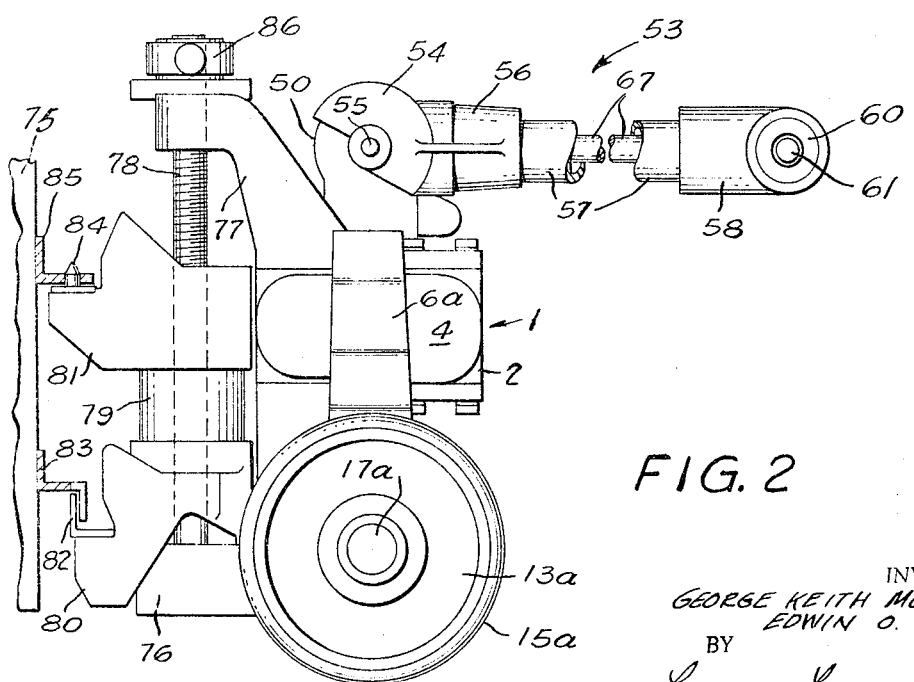
FIGURE 2 is a fragmentary, side elevational view of the vehicle and illustrating the manner in which it may be associated with a load to be transported.

Hand trucks of the kind to which the invention pertains are adapted for removable connection to opposite ends of large, nonwheeled containers such as is indicated at 75 in FIGURE 2. In attaching the wheeled vehicle to the container, it is necessary that the supporting structure of the vehicle be vertically adjustable so as to enable it to engage and lift the container for transport. Apparatus constructed in accordance with the invention includes a base member 76 that is supported on the main frame and an upstanding arm or head 77 that also is supported on the main frame. Journaled in the members 76 and 77 is a threaded shaft 78 which extends through a threaded block 79 on which is supported a lower lift member 80 and an upper lift member 81. The lower lift member 80 includes an upstanding bracket 82 that is adapted to engage a companion bracket 83 that is fixed to the container 75. The upper support member 81 carries an upstanding pin 84 that is adapted to extend through an opening formed in a bracket 85 which is mounted on the container 75. The screw 78 is adapted to be rotated by means of a ratchet wrench 86 supported at the upper end of the screw so as to effect raising and lowering movements of the support members 80 and 81. It will be understood that hydraulic, pneumatic, or other suitable lift means may be substituted for the lift apparatus just described.

In the operation of the apparatus, one of the hand trucks may be connected to the container to be transported at one end of the container and a second, similar truck connected to the opposite end of the container. The lift mechanisms associated with each truck then may be actuated to lift the container clear of the surface on which it ordinarily rests so as to be transported from one place to another. When the container has been raised to a suitable level, the operators at each end of the container will manipulate the handles 59 and 60 so as to elevate the yokes 40 and release the brakes in the manner previously described. Thereafter, the trucks may be pushed or pulled to move the container to a desired location, the transporting of the container being facilitated by the steerability of the truck wheels. Should either operator release his drawbar handle, either intentionally or inadvertently, the brake applying mechanism of the associated truck will operate automatically to set or apply the brakes of that particular truck. Accordingly, there is no likelihood of inadvertent shifting of the trucks or of the container.

The disclosed embodiment is representative of a presently preferred form of the invention, but is intended to be illustrative rather than definitive thereof. The invention is defined in the claims.

What is claimed is:

1. Brake actuating mechanism for a vehicle having a frame on which is journaled at least one wheel for rotation about an axis, said mechanism comprising first brake means mounted on said wheel for rotation therewith about said axis; second brake means mounted on said frame adjacent said first brake means for movement in a direction generally parallel to said axis into engagement therewith; brake operating means mounted on said frame for movement in a direction generally parallel to said axis; force applying means acting on said operating means and constantly urging the latter for movement in a direction generally parallel to said axis to engage said first and second brake means; motion transmission means operable to move said operating means in a direction to disable said force applying means; and manually operable means connected with said motion transmission means and movable from an inactive position to an operative position to actuate said engageable means and effect disabling of said force applying means, said force applying means acting on said motion transmission means when said manual operating means is in said operative position to urge said manual operating means to said inactive position.

2. Brake actuating mechanism for a vehicle having a frame means on which is rotatably journaled at least one wheel means and to which a tow bar is movably connected, said mechanism comprising a plurality of first brake parts mounted on one of said means; a plurality of cooperable, second brake parts mounted on the other of said means and alternating with said first parts, said first parts and said second parts being rotatable relatively to one another in response to rotation of said wheel means; brake operating means movably mounted on said frame means and operable to effect forcible engagement between said first and second parts; force applying means acting on said operating means and constantly urging the latter in a direction to effect engagement of said first and second parts; motion transmission means carried by said frame means for movement independent of tow bar movement operable to move the operating means in a direction to disable said force applying means; and manually operable actuating means connected with said motion transmission means and movable from an inactive position to an operative position to actuate said motion transmission means and effect disabling of said force applying means, said force applying means acting on said motion transmission means when said manual operating means is in said operative position to urge said manual operating means to said inactive position.

3. Brake actuating mechanism for a vehicle having a frame on which at least one wheel is rotatably journaled, said mechanism comprising first brake means mounted on said wheel for rotation therewith; second brake means mounted on said frame adjacent said first brake means for engagement therewith; brake operating means movably mounted on said frame; force applying means acting on said operating means and constantly urging the latter in a direction to engage said first and second brake means; rockable means mounted on said frame to move said operating means in a direction to disable said force applying means; linearly reciprocable means mounted on said frame; means connecting said reciprocable means with said rockable means for rocking the latter in response to movement of said reciprocable means; rotatable means; and means connecting said rotatable means with said reciprocable means for effecting movement of the latter in response to rotation of said rotatable means.

4. The mechanism set forth in claim 3 wherein said force applying means reacts between said frame and said operating means and constantly urges said reciprocable means to move in one direction.

5. The mechanism set forth in claim 3 wherein said first brake means comprises a plurality of disk members and said second brake means comprises a plurality of plate members interleaved with said disk members.

6. The mechanism set forth in claim 3 including a support, means mounting said frame on said support for swiveling movements about a first substantially vertical axis, and means mounting said reciprocable means on said support for swiveling movements about a second substantially vertical axis.

7. The mechanism set forth in claim 6 including means connected with said frame for swiveling the latter and said reciprocable member.

8. The mechanism set forth in claim 6 wherein the connection between said rockable means and said reciprocable means is on said first axis.

9. In a vehicle having a frame and at least one wheel journaled on said frame for rotation about an axis, the combination of cooperable brake means supported on said wheel and on said frame and engageable with and disengageable from one another; brake operating means supported on said frame for movement in a direction generally parallel to said axis and operable to effect engagement and disengagement of said brake means; force applying means acting on said brake operating means and urging the latter constantly in a direction generally parallel to said axis to effect engagement of said brake means; drawbar means; means mounting said drawbar means on said frame for movements relative to the latter; control means supported on said drawbar means; and means interconnecting said control means and said operating means for selectively effecting movements of the latter in a direction generally parallel to said axis to effect engagement and disengagement of said brake means regardless of the position of said drawbar means.

10. The construction set forth in claim 9 wherein said force applying means constantly acts on said interconnecting means to urge the latter and said control means in such directions as to effect engagement of said brake means.

11. The construction set forth in claim 9 wherein said mounting means mounts said drawbar means for swiveling movements about a substantially vertical axis.

12. The construction set forth in claim 11 including means mounting said wheel on said frame for swiveling movements about a substantially vertical axis, and including motion transmitting means interconnecting said drawbar means and said wheel for swiveling the latter in response to swiveling of said drawbar means.

13. The construction set forth in claim 12 wherein said motion transmitting means multiplies the swiveling movement of said drawbar means whereby to effect greater swiveling movement of said wheel for any given swiveling movement of said drawbar means.

14. The construction set forth in claim 9 wherein said mounting means mounts said drawbar means for swiveling movements about a substantially horizontal axis.

15. A vehicle comprising a frame; a pair of wheels; means journaling said wheels respectively at opposite sides of said frame for rotation about a horizontal axis; first brake means on each of said wheels and rotatable therewith; second brake means on said frame and adjacent each of said first brake means for engagement and disengagement therewith; a pair of brake operating members supported by said frame, one adjacent each of said wheels for movement in a direction generally parallel to said axis into engagement with the associated second brake means; spring means acting on each of said operating members and constantly urging the latter in a direction generally parallel to said axis to effect engagement of the associated first and second brake means; a pair of crank members supported on said frame, one adjacent each of said operating members and connected thereto; a crank actuating member connected to each of said crank members operable to actuate said crank members simultaneously and move the latter from a first position in which said operating members are enabled to effect engagement of said brake means to a second position in which said operating members are disabled from effecting engagement of said brake means; drawbar means; means mounting said drawbar means on said frame for movements relative thereto; and means connected to said crank actuating member for moving the latter from said first position to said second position regardless of the position of said drawbar member.

16. The construction set forth in claim 15 wherein the last mentioned means includes a reciprocable shaft; manually operable means supported by said drawbar means; and motion transmitting means interconnecting said manually operable means and said shaft.

17. The construction set forth in claim 16 wherein said manually operable means comprises rotatable handle means journaled in said drawbar means, and wherein said motion transmission means includes gearing interconnecting said handle means and said shaft.

18. The construction set forth in claim 15 including means mounting said wheel journaling means on said frame for swiveling movements about a substantially vertical axis.

19. The construction set forth in claim 18 including means interconnecting said drawbar means and said wheel journaling mounting means for swiveling the latter in response to movements of said drawbar means.

References Cited by the Examiner
UNITED STATES PATENTS

| | | | |
|---|---|---|---|
| 858,658 | 7/1907 | Kennedy | 180—19 |
| 1,274,885 | 8/1918 | Hurst. | |
| 1,559,796 | 11/1925 | Shuey et al. | 188—167 |
| 1,709,527 | 5/1929 | Ford | 188—167 |
| 2,228,247 | 1/1941 | Cunningham | 280—47.11 |
| 3,132,724 | 5/1964 | Ansteth | 188—73 |

BENJAMIN HERSH, *Primary Examiner.*

A. HARRY LEVY, *Examiner.*

J. A. PEKAR, *Assistant Examiner.*